(12) United States Patent
Gagliardi, Jr.

(10) Patent No.: US 7,134,958 B2
(45) Date of Patent: Nov. 14, 2006

(54) METHOD OF MAKING BIRD WING AND BREAST PRODUCTS AND PRODUCTS MADE IN ACCORDANCE WITH THE METHOD

(75) Inventor: Eugene D. Gagliardi, Jr., Atglen, PA (US)

(73) Assignee: Skippack Creek Corporation, Wilmington, DE (US)

( * ) Notice: Subject to any disclaimer, the term of this patent is extended or adjusted under 35 U.S.C. 154(b) by 0 days.

(21) Appl. No.: 11/344,031

(22) Filed: Jan. 31, 2006

(65) Prior Publication Data
US 2006/0183416 A1    Aug. 17, 2006

Related U.S. Application Data

(60) Provisional application No. 60/653,333, filed on Feb. 16, 2005.

(51) Int. Cl.
*A22C 21/00* (2006.01)
(52) U.S. Cl. ...................................... 452/149
(58) Field of Classification Search ............... 452/149, 452/150, 153, 155, 160, 163, 164, 106, 132, 452/135, 136, 137; 426/55, 478–480, 644
See application file for complete search history.

(56) References Cited

U.S. PATENT DOCUMENTS

| | | | | |
|---|---|---|---|---|
| 3,594,189 | A | * | 7/1971 | Panattoni .................. 426/104 |
| 5,415,881 | A | * | 5/1995 | Gagliardi .................... 426/76 |
| 5,667,436 | A | * | 9/1997 | Gagliardi, Jr. ............. 452/149 |
| 5,932,278 | A | * | 8/1999 | Gagliardi, Jr. ............. 426/644 |
| 6,428,838 | B1 | * | 8/2002 | Gagliardi, Jr. ............. 426/644 |
| 6,939,217 | B1 | * | 9/2005 | Gagliardi, Jr. ............. 452/149 |
| 7,029,388 | B1 | * | 4/2006 | Gagliardi, Jr. ............. 452/198 |

* cited by examiner

*Primary Examiner*—Thomas Price
(74) *Attorney, Agent, or Firm*—Akin Gump Strauss Hauer & Feld, LLP

(57) ABSTRACT

A method of cutting a whole bird to form bird meat products comprises: removing a portion of each of the wings of the bird including the wing tip sections and the center, two bone sections; removing both of the breasts and the drumettes of the wings from the remainder of the bird leaving the drumettes attached to the removed breasts; and cutting through each of the removed breasts along cut lines extending approximately one third of the distance along the length of each of the removed breasts and generally parallel to the bones of the removed drumettes to create two breast products and two breast/drumette products. In one embodiment the breast products are cut in half lengthwise to form smaller breast products.

10 Claims, 2 Drawing Sheets

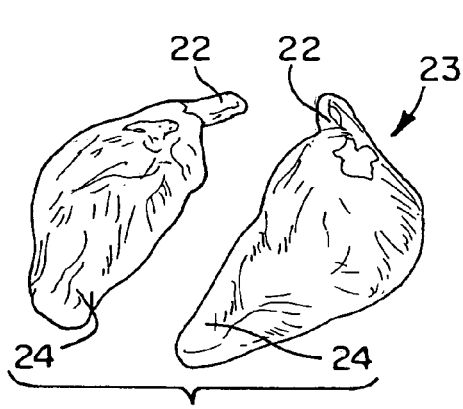
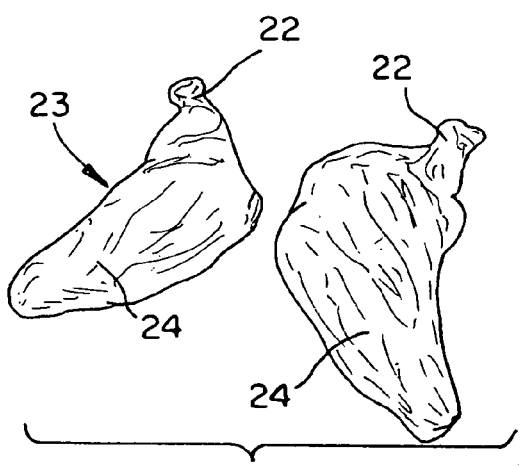
FIG. 5
FIG. 6
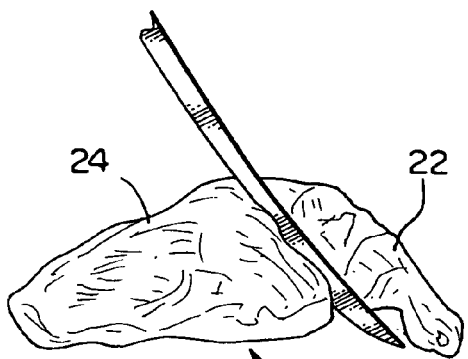
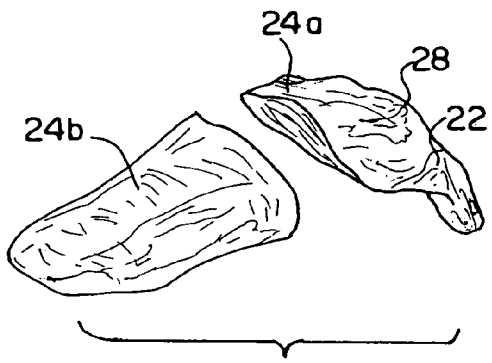
FIG. 7
FIG. 8
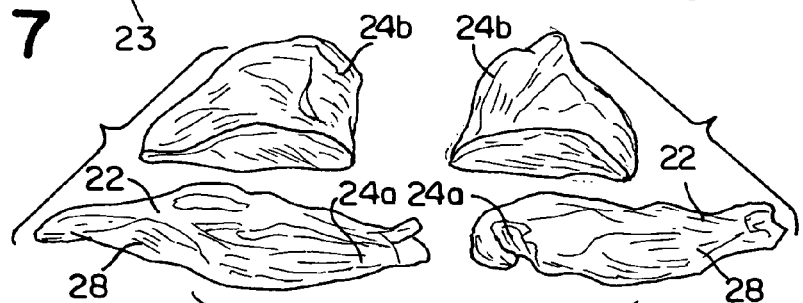
FIG. 9
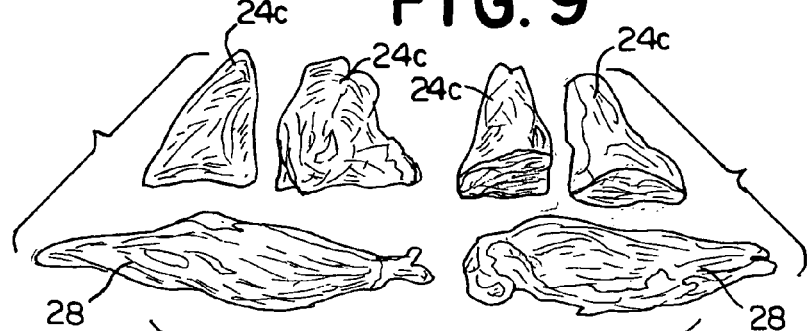
FIG. 10

METHOD OF MAKING BIRD WING AND BREAST PRODUCTS AND PRODUCTS MADE IN ACCORDANCE WITH THE METHOD

CROSS REFERENCE TO RELATED APPLICATIONS

This application claims priority from U.S. Provisional Patent Application No. 60/653,333 filed Feb. 16, 2005 and entitled "Method of Making Bird Wing and Breast Products and the Products Made in Accordance with the Method" the subject matter of which is hereby incorporated herein by reference.

BACKGROUND OF THE INVENTION

The present invention relates generally to a method of making food products from a bird and, more particularly, to a method of making food products from the wing and breast of a bird and the food products made in accordance with the method.

Birds, such as poultry and fowl, are conventionally eviscerated, dressed and sold either as a whole bird or as severed parts, i.e., breasts, wings, drumsticks, thighs, etc. In recent years there has been an increasing demand for innovative meat products, particularly products that require less time for preparation and which include little or no waste. There has also been an increasing demand for meat products which are boneless or substantially boneless, making such products easier to consume. Hence, products such as boneless, skinless chicken breasts, chicken tenders, etc. have enjoyed great commercial success. Other innovative products, such as hot wings, buffalo wings, and other hand-held "snack foods" have also attained popularity for the respective bird parts from which they are prepared. However, such products, particularly products made from the wing of a bird, contain a relatively small meat to bone ratio and, as a result, require a substantial amount of work to remove the meat from the bone for consumption. The present invention comprises an improved method of cutting a bird, particularly the wing and the breast of a bird, to provide a combined wing and breast product having a substantially increased amount of meat thereon. Additional more uniformly sized breast meat products are also formed as a result of the present method.

BRIEF SUMMARY OF THE INVENTION

The present invention comprises a method of cutting a whole bird to form bird meat products including the steps of; removing a portion of the wing of the bird including the wing tip section and the center, two bone sections; removing the breast and the drumette of the wing from the remainder of the bird leaving the drumette attached to the removed breast; and cutting through the removed breast along a cut line extending approximately one third of the distance along the length of the removed breast and generally parallel to the bone of the removed drumette to create a breast product and a breast/drumette product.

In another embodiment, the present invention comprises a method of cutting a whole bird to form bird meat products including the steps of: removing a portion of each of the wings of the bird including the wing tip sections and the center, two bone sections; removing both of the breasts and the drumettes of the wings from the remainder of the bird leaving the drumettes attached to the removed breasts; and cutting through each of the removed breasts along cut lines extending approximately one third of the distance along the length of each of the removed breasts and generally parallel to the bones of the removed drumettes to create two breast products and two breast/drumette products.

The invention also comprises the bird meat products made in accordance with the above described methods.

BRIEF DESCRIPTION OF THE SEVERAL VIEWS OF THE DRAWINGS

The foregoing summary as well as the following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 5 is a top perspective view of the removed breasts and drumette portions of the wings of the chicken shown in FIG. 2 showing the meat side;

FIG. 6 is a top perspective view of the removed breasts and drumette portions of FIG. 5 showing the skin side;

FIG. 7 is a top perspective view of one of the breasts and drumette portions of FIG. 5 showing a cut being made along a cut line extending through the breast;

FIG. 8 is a view similar to FIG. 7 showing a portion of the breast separated from the remainder of the breast and drumette after the cut through the breast has been made as shown in FIG. 7;

FIG. 9 is a view similar to FIG. 8 showing both of the separated breast portions and the breast and drumette portions; and FIG. 10 is a view similar to FIG. 9 after the separated breast portions have been cut generally in half lengthwise.

DETAILED DESCRIPTION OF THE INVENTION

Figure 1:
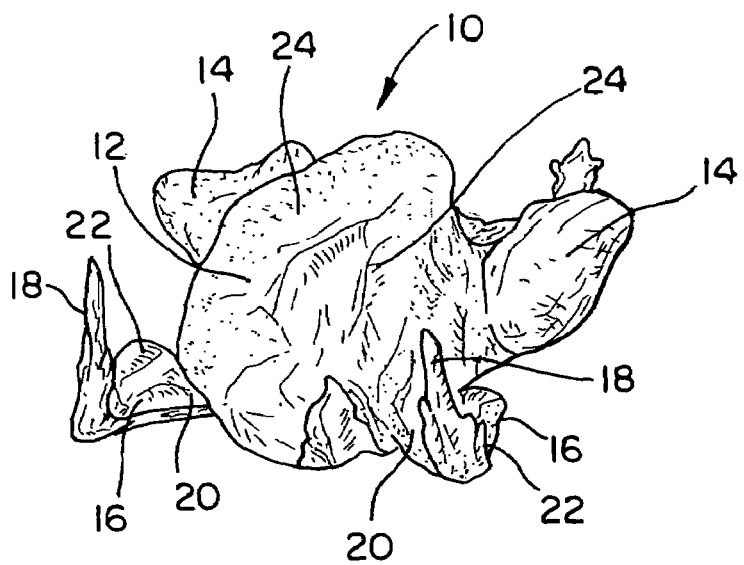
FIG. 1 is a top perspective view of a typical whole chicken which is used for illustrating the preferred method of the present invention.

Referring to the drawings, wherein the same reference numerals are used to designate the same components throughout the several figures, FIG. 1 is a top perspective view of a typical whole chicken 10 which is used for the purpose of illustrating a preferred embodiment of the method of the present invention. It should be understood by those of ordinary skill in the art that while a whole chicken 10 is used for illustrating the preferred embodiment of the present method, the present invention is equally applicable to virtually any other type of poultry, fowl or virtually any other type of bird. Accordingly, the present invention should not be considered to be limited to use with a whole chicken 10.

As shown in FIG. 1, the chicken 10, like any other whole chicken, includes a body portion 12, a pair of legs 14, each including a drumstick and a thigh, and a pair of wings 16. As is known to those skilled in the art, each of the wings 16 includes three sections, namely a wing tip section 18 on the outward or distal end of the wing 16, a drumette section 20 having one end which is joined with the chicken body 12 and a center or two bone section 22 which is joined on one end to the other end of the drunette 20 and is joined on the other end to the wing tip 18. The body portion 12 also includes two breasts 24, one on each lateral side, ribs (not shown), a back (not shown) and other standard chicken components well known to those skilled in the art.

Figure 2:
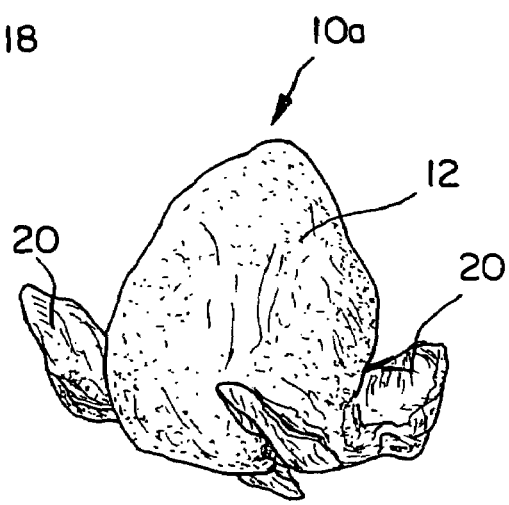
FIG. 2 is a top perspective view of the chicken shown in FIG. 1 with the legs removed and with portions of the wings removed.

The first step of the present method is illustrated by FIG. 2 which shows a modified whole chicken 10a. In the modified whole chicken 10a shown in FIG. 2 the legs 14 have been removed. The removal of the legs 14 is for convenience only and is not a required step of the present method. In addition, the tip section 18 and the center or two bone section 22 of each of the wings 16 have been removed leaving the drumettes 20 as the only remaining extremities attached to the chicken body 12. The legs 14 and removed wing components 18, 22 may be removed in a manner well known in the art using any tool or apparatus known to those skilled in the art including, for example, a knife, saw, water knife or the like. The removed components (legs 14 and removed wing components 18, 22) may be used as chicken parts in the usual manner or may be used in some other manner.

Figure 3:
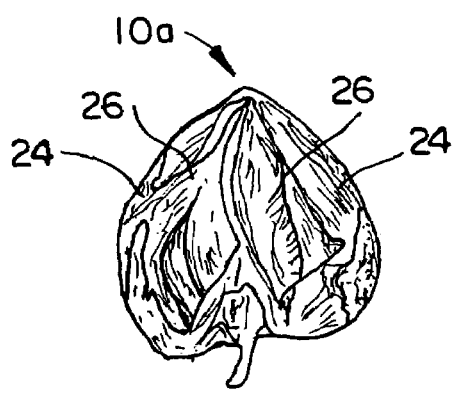
FIG. 3 is a top perspective view of the chicken shown in FIG. 2 with both of the breasts partially cut away from the remainder of the chicken body.
Figure 4:
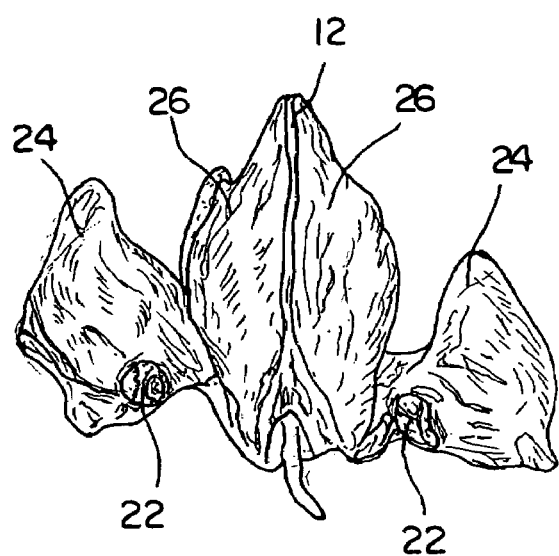
FIG. 4 is a top perspective view of the chicken shown in FIG. 3 with the breasts and remaining (drumette) portions of the wings completely removed from the remainder of the chicken body.

The next step involved in the preferred embodiment of the present method is to remove each of the breasts 24 and the drumettes 20 from the remainder of the chicken body 12. FIG. 3 illustrates the initial cutting step in removing the breasts 24 from the remainder of the chicken body 12. This cutting step as well as the below described cutting steps are preferably accomplished using a knife. However, it will be recognized by those skilled in the art that any other suitable cutting device or apparatus could alternatively be used. Notice in FIG. 3 that the chicken tenders 26 are not removed but, instead, remain with the chicken body 12. FIG. 4 shows the completion of the removal of both of the breasts 24 and drumettes 22 from the remainder of the chicken body 12. As shown, each of the breasts 24 is still attached to the respective drumette 20. As previously noted, the tenders 26 are still attached to the remainder of the chicken body 12. The tenders 26 as well as the remainder of the chicken body 12 may be further cut or otherwise used in any desired manner known to those skilled in the art. FIGS. 5 and 6 are top and bottom perspective views of the resulting combination breast 24 and drumette 22, portions 23 which have been completely removed from the chicken body 12 in the manner as illustrated in FIGS. 3 and 4.

FIG. 7 is a top perspective view of one of the combination breast 24 and drumette 22, portions 23 shown in FIGS. 5 and 6 illustrating the next step in the present embodiment, namely cutting through the breast 24 along a cut line (identified by the knife) extending approximately one third of the way along the length of the breast 24 and generally parallel to the bone of the drumette 22. Preferably the cut is made using a knife as shown but some other device or apparatus could be used. FIG. 8 illustrates the result of making the cut through the breast 24 as shown in FIG. 7. As illustrated in FIG. 8, a portion (approximately one third) of the breast 24a, specifically the thicker or larger end of the breast 24a remains secured to the drumette 22, leaving the remaining portion (approximately two thirds of the length) of the breast 24b separated from the drumette 20 as shown. The portion of the breast 24a which remains attached to the drumette 22 is actually the thickest portion of the breast 24, resulting in a combination drumette/breast product 28 which includes substantial additional white meat (as compared to the meat of the drumette 22 alone) in the form of the attached breast portion 24a.

FIG. 9 is a view similar to FIG. 8 but showing both of the breast portions 24b and both of the breast/drumettes products 28 of the chicken 10 which have been cut in accordance with the step shown in FIG. 7. The resulting breast/drumette products 28 include all of the white meat normally associated with the drumette 22 as well as the thicker portion of the breast 24a. The breast portions 24b may be used as products as is. Alternatively, as shown in FIG. 10, the thinner portions of the breast 24b are sliced approximately in half lengthwise to provide four generally equally sized breast meat products 24c which may be used for chicken strips, chicken nuggets or the like. Because the breast meat products 24c come from the thinner portion of the breast 24 they are generally thinner and of a generally uniform thickness and, therefore, provide a more uniform, bite-sized breast meat product 24c which cooks more evenly.

From the foregoing it can be seen that the present invention comprises a method of cutting the breasts 24 and drumettes 22 of a chicken or other bird to provide new, meatier breast/drumette products 28 which includes a substantial amount of breast meat as well as additional breast meat products 24c. It will be appreciated by those of ordinary skill in the art that changes could be made to the embodiment described above without departing from the broad inventive concepts thereof. It is understood, therefore, that this invention is not limited to the particular embodiment disclosed, but it is intended to cover modifications within the spirit and scope of the present invention as defined by the appended claims

The invention claimed is:

1. A method of cutting a whole bird to form bird meat products comprising:
   removing a portion of the wing of the bird including the wing tip section and the center, two bone section;
   removing the breast and the drumette of the wing from the remainder of the bird leaving the drumette attached to the removed breast; and
   cutting through the removed breast along a cut line extending approximately one third of the distance along the length of the removed breast and generally parallel to the bone of the removed drumette to create a breast product and a breast/drumette product.

2. The method as recited in claim 1 further comprising cutting the breast product in half lengthwise to provide two generally equally sized breast products.

3. The food products made in accordance with the method of claim 2.

4. The method as recited in claim 1 wherein all of the cuts are made using one of a knife, a saw and a water knife.

5. The food products made in accordance with the method of claim 1.

6. A method of cutting a whole bird to form bird meat products comprising:

removing a portion of each of the wings of the bird including the wing tip sections and the center, two bone sections;

removing both of the breasts and the drumettes of the wings from the remainder of the bird leaving the drumettes attached to the removed breasts; and cutting through each of the removed breasts along cut lines extending approximately one third of the distance along the length of each of the removed breasts and generally parallel to the bones of the removed drumettes to create two breast products and two breast/drumette products.

7. The method as recited in claim 6 further comprising cutting each of the breast products in half lengthwise to provide four generally equally sized breast products.

8. The food products made in accordance with the method of claim 5.

9. The method as recited in claim 6 further comprising removing both of the legs of the bird prior to removing the breasts and drumettes.

10. The food products made in accordance with the method of claim 4.

* * * * *